United States Patent [19]

Quaeck

[11] Patent Number: 5,222,590
[45] Date of Patent: Jun. 29, 1993

[54] RECIPROCATING FLOOR CONVEYOR DRIVE MECHANISM

[76] Inventor: Manfred W. Quaeck, 1515-210th Ave. N.E., Redmond, Wash. 98053

[21] Appl. No.: 978,913

[22] Filed: Nov. 19, 1992

[51] Int. Cl.⁵ .................................... B65G 25/04
[52] U.S. Cl. .................... 198/550.01; 198/750
[58] Field of Search ............... 198/550.01, 750; 414/525.1

[56] References Cited

U.S. PATENT DOCUMENTS

| | | |
|---|---|---|
| Re. 33,196 | 4/1990 | Foster . |
| 3,534,875 | 10/1970 | Hallstrom . |
| 4,143,760 | 3/1979 | Hallstrom . |
| 4,144,963 | 3/1979 | Hallstrom . |
| 4,157,761 | 6/1979 | Debor . |
| 4,184,587 | 1/1980 | Hallstrom . |
| 4,492,303 | 1/1985 | Foster . |
| 4,611,708 | 9/1986 | Foster . |
| 4,679,686 | 7/1987 | Foster . |
| 4,691,819 | 9/1987 | Hallstrom . |
| 4,727,978 | 3/1988 | Hallstrom . |
| 4,749,075 | 6/1988 | Foster . |
| 4,785,929 | 11/1988 | Foster . |
| 4,856,645 | 8/1989 | Hallstrom . |
| 4,940,132 | 7/1990 | Foster . |
| 5,064,052 | 11/1991 | Foster . |
| 5,088,595 | 2/1992 | Hallstrom . |
| 5,096,356 | 3/1992 | Foster . |
| 5,103,866 | 4/1992 | Foster . |
| 5,125,502 | 6/1992 | Foster . |

Primary Examiner—D. Glenn Dayoan
Attorney, Agent, or Firm—Graybeal Jackson Haley & Johnson

[57] ABSTRACT

A drive mechanism for a reciprocating floor conveyor, wherein the conveyor has a plurality of individually reciprocatable groups of slats, includes a drive cylinder for each of the slat groups located adjacent to an end of the slats. A cross-member for each of the slat groups fixedly secures all of the slats of the slat group. A drive rod for each of the slat groups connects one of the drive cylinders and one of the cross-members. A wall separates the cross-members and the drive cylinders, with the drive rods extending through the wall.

20 Claims, 4 Drawing Sheets

RECIPROCATING FLOOR CONVEYOR DRIVE MECHANISM

BACKGROUND OF THE INVENTION

Reciprocating floor conveyors are generally employed for transport of liquid bearing material such as, for example, garbage. Liquid impermeable reciprocating floor conveyors comprised of a plurality of slat groups are known in the art. These liquid-tight reciprocating floor conveyors are often employed in containers such as truck or trailer boxes, transport containers, or fixed installation containers, each having a bottom, two sides, two ends (one of which is openable), and, optionally a top. The liquid-tight reciprocating floor conveyor is supported by the bottom of the container.

Drive mechanisms for reciprocating floor conveyors are generally located under the slats of the reciprocating floor. However, such a drive mechanism location is inappropriate for liquid impermeable reciprocating floor conveyors. Mounting a drive mechanism underneath a liquid-tight reciprocating floor conveyor is extremely laborious, and very costly. Specifically, an extensive hose and tubing system is required to connect the hydraulic fluid supply located at the front of the container to the drive units located underneath the reciprocating floor conveyor. Furthermore, to install the drive mechanism underneath the reciprocating floor conveyor requires that the container bottom have large openings therein. These openings compromise the structural integrity of the container bottom which results in bending and shear forces being translated from this unstable container bottom to the slats of the reciprocating floor conveyor; the result being excessive slat wear and damage.

U.S. Pat. Nos. 5,125,502 and 5,096,356 issued to Foster disclose a drive mechanism for a reciprocating floor conveyor which is located not underneath, but at an end of the reciprocating floor conveyor. The Foster conveyor comprises a plurality of elongated load supporting floor members supported for longitudinal back and forth movement within a material receiving compartment. A drive assembly compartment is provided at one end of the material receiving compartment. A bulkhead is positioned between the material receiving compartment and the drive assembly compartment. A plurality of piston-cylinder drive units are positioned within the drive assembly compartment. Each drive unit is associated with a separate set of the floor members. The drive units are operated to move the floor members longitudinally. Each drive unit includes longitudinally extending drive rods, one for each of its floor members. The drive rods extend from the drive units through the bulkhead, into the material receiving compartment and are connected to the floor members within the material receiving compartment. The bulkhead is provided with a plurality of bushings, one for each drive rod. The drive rods extend through the bushings. The bushings include seals for sealing against liquid leakage from the material receiving compartment, through the bushings, and into the drive assembly compartment.

The above Foster drive mechanism suffers from the following shortcomings. First, the drive mechanism is located within the container itself, thus decreasing the effective slat length of the reciprocating floor conveyor available, which decreases the volume of the load to be carried in a given container. Additionally, the location of the drive mechanism within the container results in limited access to the drive mechanism for repair and maintenance. Second, Foster employs one drive rod for each slat of the reciprocating floor conveyor. This configuration is unduly complex, thus being susceptible to component failure and is unduly costly. More importantly, the excessive number of drive rods results in numerous openings in the bulkhead through which the drive rods pass to their connected slats. Every one of these openings in the bulkhead is potential source of liquid leakage. Third, each bulkhead opening requires a bushing which surrounds the drive rod. These bushings are another potential source of liquid leakage. Fourth, the configuration and orientation of the drive mechanism of Foster in relation to the container is structurally unsound because torque and shear forces from longitudinal movement of the slats of the reciprocating floor conveyor are not adequately counteracted.

A need thus exists for a drive mechanism for a reciprocating floor conveyor in which the drive mechanism is located at an end of the reciprocating floor conveyor container, and is further located exteriorly of the end of the container such that the effective length of the reciprocating floor conveyor is not compromised.

A need also exists for the above type of drive mechanism for a reciprocating floor conveyor in which the drive mechanism includes a number of drive rods equal to the number of cross-members employed, and not equal to the total number of slats employed, in order to reduce complexity and cost of the mechanism and to minimize the number of openings in the partitioning bulkhead to minimize liquid leakage.

A need also exists for the above type of reciprocating floor conveyor drive mechanism in which bushings in the partitioning bulkhead openings which surround the drive rods are not necessary, thus further reducing the chance of liquid leakage.

A need also exists for the above type of reciprocating floor conveyor drive mechanism which is structurally integral with the container in order to adequately accommodate the bending and shear forces associated with reciprocation of the slats of the floor conveyor.

SUMMARY OF THE INVENTION

A drive mechanism is employed with a reciprocating floor conveyor having a plurality of individually reciprocatable groups of slats. The drive mechanism includes a drive cylinder for each of the slat groups that is located adjacent to an end of the slats. A cross-member for each of the slat groups fixedly secures all of the slats of the slat group. A drive rod for each of the slat groups connects one of the drive cylinders and one of the cross-members. A wall separates the cross-members and the drive cylinders, with the drive rods extending through the wall, and the drive cylinders abutting the wall to prevent liquid leakage through the wall.

Preferably, the drive mechanism is employed with a reciprocating floor conveyor having three liquid impermeable slat groups, and the drive mechanism has three drive cylinders, three cross-members and three drive rods. The cross-members each have longitudinal edges which are beveled to minimize deposits of conveyed material between the cross-members. The cross-members are each secured to the slats by fixing each of the slats between the cross-members and a bar under the slat. A substantially planar shield over the cross-members prevents the material being conveyed from contacting the cross-members.

The slat groups are preferably contained in a compartment and the drive cylinders are located externally of the compartment. The wall between the cross-members and the drive cylinders is preferably an end wall of the compartment, and the drive cylinders are located in a chamber which is structurally integrated with the compartment and which includes a floor and side walls.

BRIEF DESCRIPTION OF DRAWINGS

The foregoing objects and attendant advantages of this invention will become more readily appreciated as the same becomes better understood by reference to the following detailed description when taken in conjunction with the accompanying drawings wherein.

DETAILED DESCRIPTION OF THE PREFERRED EMBODIMENT

Figure 1:
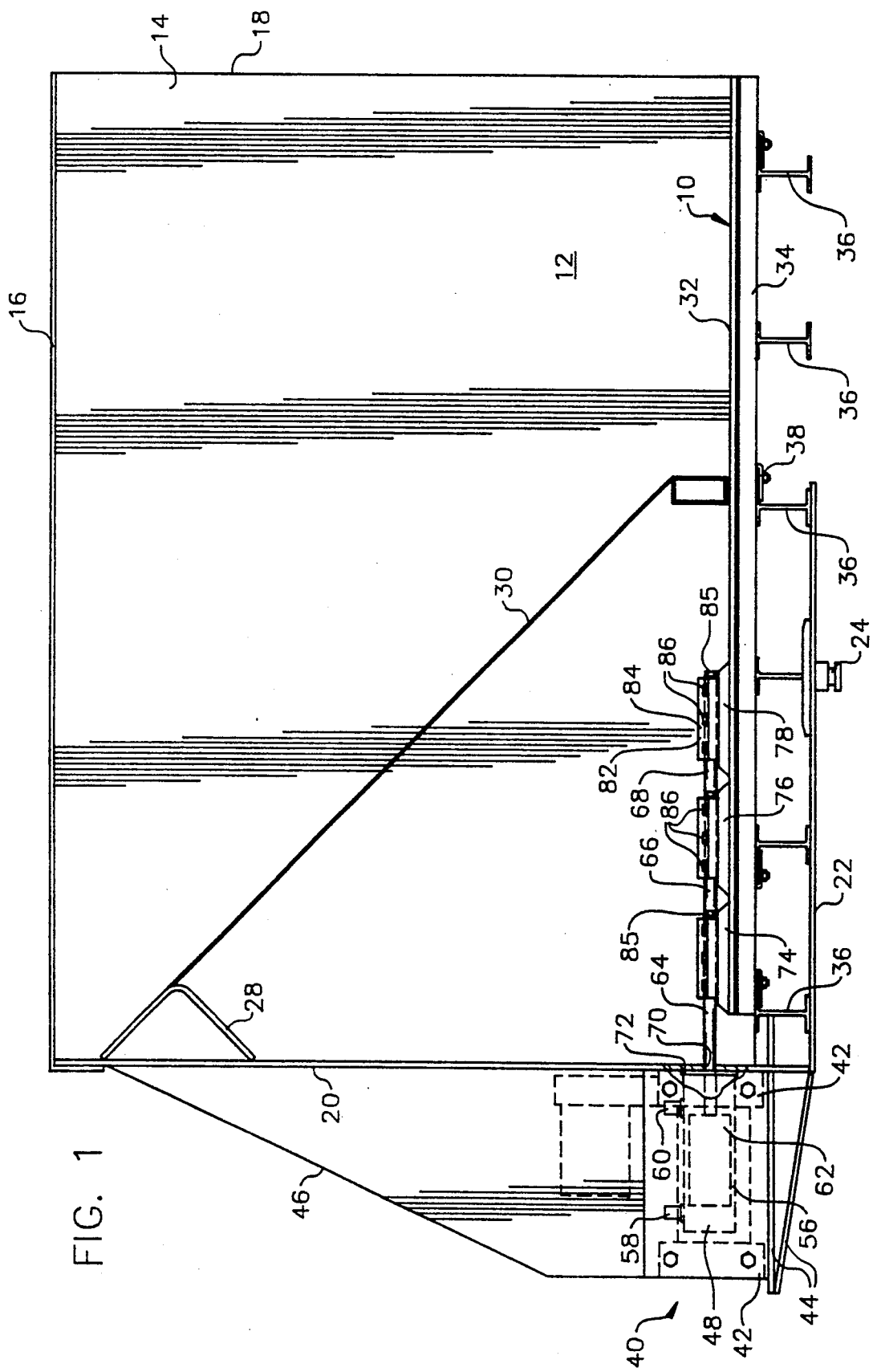
FIG. 1 is an exposed side view of the drive mechanism and reciprocating floor conveyor of the present invention.
Figure 2:
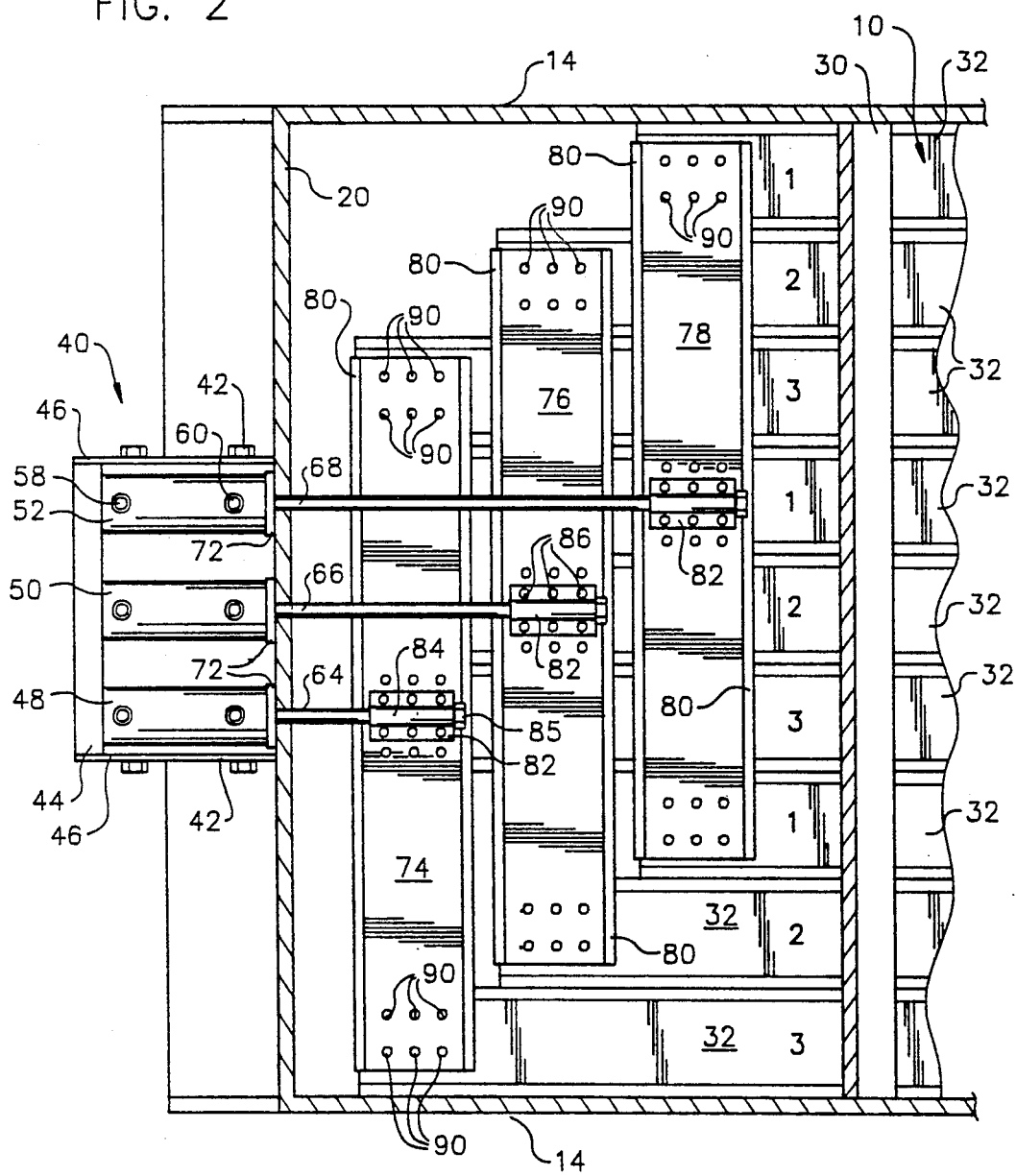
FIG. 2 is an enlarged top view of the drive mechanism and reciprocating floor conveyor of the present invention.
Figure 3:
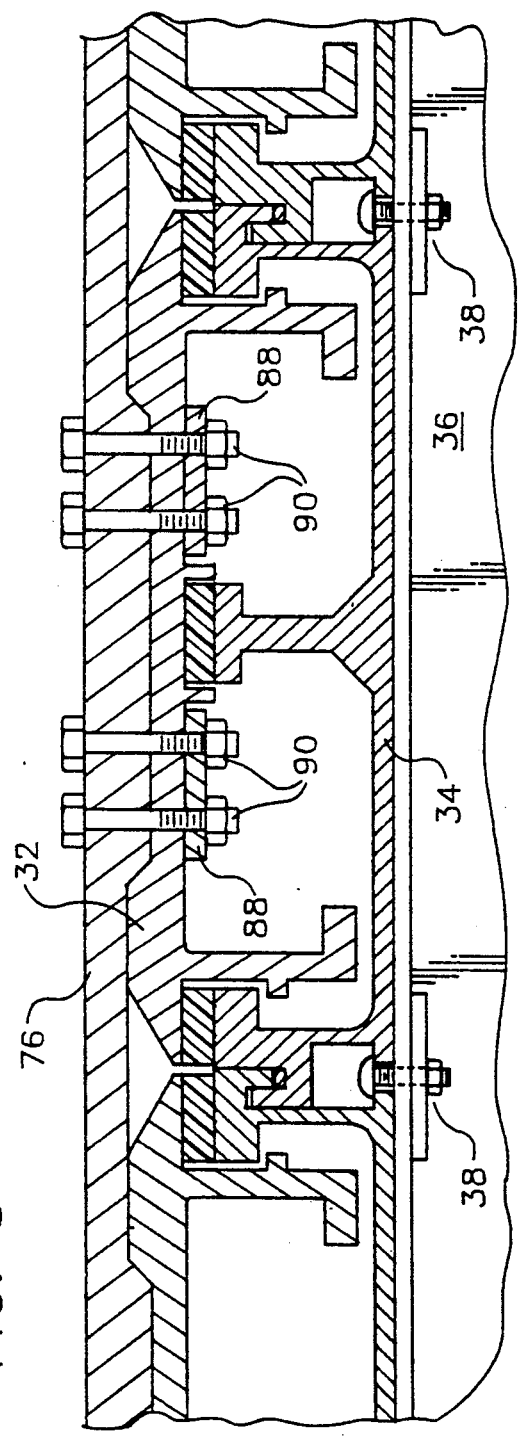
FIG. 3 is an enlarged, partially exposed end view of the cross-members and slats of the drive mechanism and reciprocating floor conveyor of the present invention.
Figure 4:
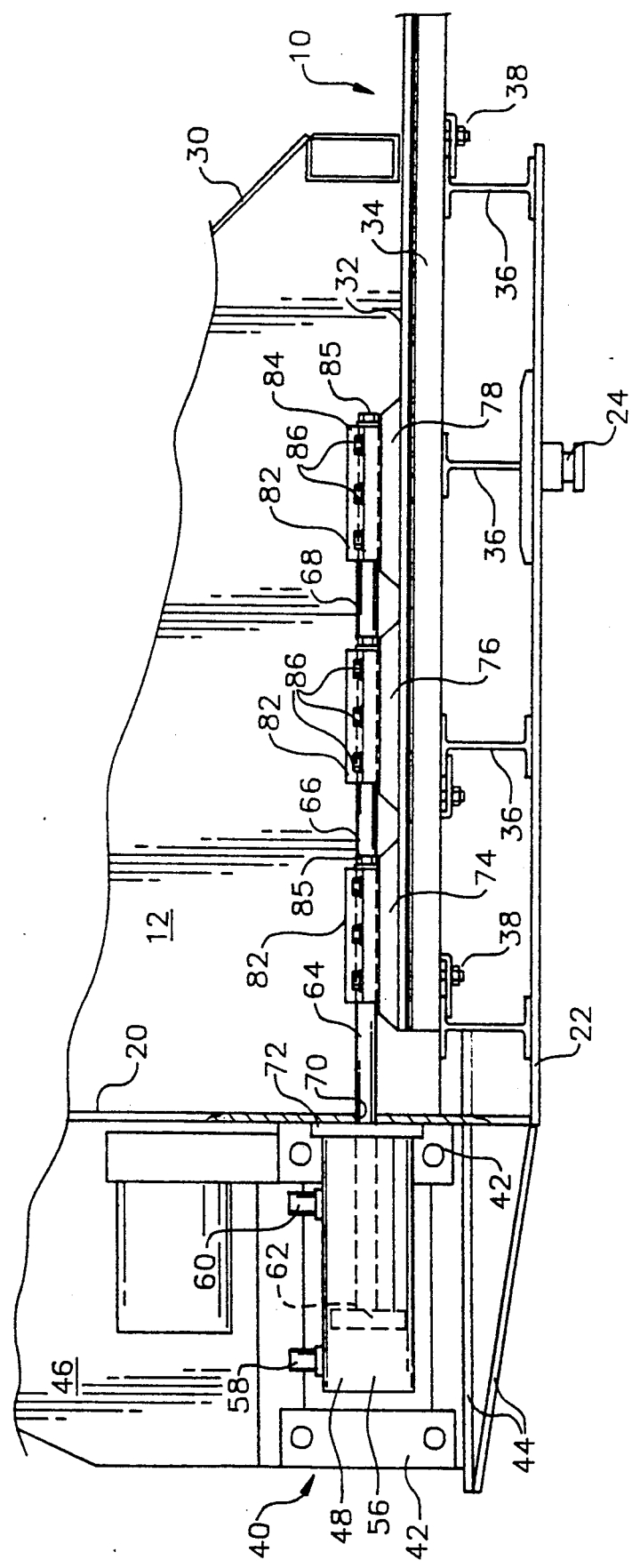
FIG. 4 is an enlarged, partially exposed side view of the drive mechanism of the present invention.

Referring to FIGS. 1-4, reciprocating floor conveyor 10 is located within compartment 12 of the container. Compartment 12 is comprised of side walls 14, optional roof 16, rear wall 18 (which may include a door), front wall 20 (which is further referred to herein below as a partitioning bulkhead) and optional floor 22. When the container is a trailer or the like, floor 22 is a king pin plate which only is present on the portion of compartment 12 having partitioning bulkhead 20 which includes king pin 24. Partitioning bulkhead 20 includes compartment cross-member 28 oriented transversely thereon and adjacent to roof 16. Angled plate 30 extends downwardly from compartment cross-member 28 toward reciprocating floor conveyor 10, and is so oriented to prevent passage of material being conveyed underneath angled plate 30.

Preferably, reciprocating floor conveyor 10 is comprised of the plurality of slat groups (slat groups 1, 2, and 3 being shown herein), each comprised of a plurality of longitudinally reciprocatable slats 32. However, more or less than three slat groups may be employed. Each of slats 32 is slidably mounted on a base member 34, which is in turn secured to a plurality of transverse beams 36 by mounting assemblies 38 which do not compromise the structural integrity of base member 34. Reciprocation of slats 32 on base members 34 is accomplished by means of bearings therebetween which are well known in the art. Transverse beams 36 are located on above described floor (or king pin plate) 22 of compartment 12. Most preferably, the reciprocating floor conveyor has a liquid impermeable configuration, as described, for example, in my copending application Ser. No. 07/749,522 filed Aug. 26, 1991, entitled LIQUID-TIGHT RECIPROCATING FLOOR CONSTRUCTION, which is incorporated herein by reference.

Drive cylinder housing 40 contains the drive cylinders, which are described in detail below. Drive cylinder housing 40 includes drive cylinder brackets 42 which brace the drive cylinders. Drive cylinder brackets 42 are supported on drive cylinder base 44 which is a platform fixedly secured to both king pin plate 22 and partitioning bulkhead 20 of compartment 12. Drive cylinder sidewalls 46 are secured to drive cylinder brackets 42, drive cylinder base 44, and partitioning bulkhead 20, which is attached to compartment cross-member 28. In turn, compartment cross-member 28 is secured to sidewalls 14 of compartment 12. The above integral configuration of drive cylinder housing 40 with partitioning bulkhead 20, sidewalls 14, compartment cross-member 28, and king pin plate 22 of compartment 12 provide a stable support structure which counteracts the shear and bending forces generated by the drive cylinders during reciprocation of slats 32 of reciprocating floor conveyor 10.

A plurality of drive cylinders are mounted between drive cylinder brackets 42 in drive cylinder housing 40. While more or less drive cylinders can be employed, three drive cylinders, drive cylinder 48, drive cylinder 50, and drive cylinder 52 are shown. Most preferably, the number of drive cylinders employed is equal to the number of groups of slats 32 present in reciprocating floor conveyor 10. Thus, for example, if three groups (1, 2 and 3) of slats 32 are employed, three drive cylinders are used. Drive cylinders 48, 50 and 52 each include a chamber 56 having fluid openings 58 and 60 at opposite ends thereof. Piston 62 is located in chamber 56 and reciprocates therein based upon passage of hydraulic fluid into fluid opening 58 and out of fluid opening 60, and the subsequent passage of hydraulic fluid into fluid opening 60 and out of fluid opening 58. Piston 62 of each of drive cylinders 48 50 and 52 is attached to drive rod 64, 66 or 68 respectively. Each of drive rods 64, 66 and 68 pass through an opening 70 in partitioning bulkhead 20. Each of drive cylinders 48, 50 and 52 are fixedly secured against partitioning bulkhead 20 with gasket 72 or the like such that a water-tight seal is produced whereby liquid cannot pass from compartment 12 through opening 70 due to the physical obstruction of drive cylinders 48, 50, and 52 and the liquid-tight seal of gasket 72. Hydraulic liquid is supplied to drive cylinders 48, 50 and 52 by means of a hydraulic source, hydraulic lines, and switching valves well known in the art.

Each of drive cylinders 48, 50 and 52 are connected to one of cross-members 74, 76 and 78, by drive rod 64, 66 or 68, respectively. Cross-member 74, 76, and 78 are each located transversely on slats 32 under angled plate 30 to minimize conveyed material from being trapped therebetween. Three cross-members 74, 76 and 78 are described herein but it is to be understood that a fewer or greater number of cross-members can be employed. Preferably, the number of cross-members employed is equal to the number of groups of slats 32 that are used. Thus, in the present example, three cross-members 74, 76 and 78 are used, one for each of the three slat groups 1, 2 and 3 such that cross-member 74 connects all of slats 32 of slat group 1, cross-member 76 connects all of slats 32 of slat group 2, and cross-member 78 connects all of slats 32 of slat group 3. Each of cross-members 74, 76 and 78 connect all of the slats 32 of one of the slat groups 1, 2 or 3 such that extension and retraction of one of drive cylinder 48, 50 or 52 causes extension and retraction of one of drive rods 64, 66 or 68, which in turn causes reciprocation of one of cross-members 74, 76 or 78, resulting in longitudinal reciprocation of all of the slats 32 one of the three slat groups 1, 2 or 3. Each of cross-members 74, 76, and 78 preferably have longitudinal edges 80 which are beveled or angled in order to minimize deposits of the conveyed material between cross-members 74, 76 and 78.

Cross-members 74, 76 and 78 are preferably attached to drive rod 64, 66 and 68, respectively, by cross-member bracket 82 which consists of a sleeve 84 which threadedly engages with the end of drive rod 64, 66 or 68 remote from piston 62 by means of bolt 85. Bolts 86 are employed to secure sleeves 84 to cross-members 74, 76 or 78.

Cross-members 74, 76 and 78 are each fixedly secured to all slats 32 of one of slat groups 1, 2 or 3 by attachment bar 88 located under slat 32. A plurality of attachment bars 88 and one of cross-members 74, 76 or 78 thus sandwich all of slats 32 of one of slat groups 1, 2 and 3, and are securely attached by means of bolts 90.

While preferred embodiments of the invention have been illustrated and described, it will be appreciated that various changes can be made therein without departing from the spirit and scope of the invention.

I claim:

1. A reciprocating floor conveyor comprising:
a plurality of individually reciprocatable groups of slats, each of said slats having an end;
drive means adjacent said ends of said slats, said drive means including a drive cylinder for each of said slat groups, a cross-member for each of said slat groups securing all of said slats of one of said slat groups, and a drive rod for each of said slat groups connecting one of said drive cylinders and one of said cross-members; and
a wall between said cross-members and said drive cylinders, said drive rods extending through said wall.

2. The reciprocating floor conveyor of claim 1 having three slat groups, three drive cylinders, three cross-members and three drive rods.

3. The reciprocating floor conveyor of claim 1 wherein each of said cross-members is an elongated beam having longitudinal edges, said longitudinal edges being beveled.

4. The reciprocating floor conveyor of claim 1 wherein said slat groups are impermeable to liquid.

5. The reciprocating floor conveyor of claim 1 wherein each of said cross-members is secured to each of said slats of one of said slat groups by fixing each of said slats between said cross-member and a bar under said slat.

6. The reciprocating floor conveyor of claim 1 further comprising a substantially planar, angled shield over said cross-members, said shield preventing material being conveyed from contacting said cross-members.

7. The reciprocating floor conveyor of claim 1 wherein said drive cylinders abut said wall to prevent liquid leakage.

8. The reciprocating floor conveyor of claim 1 further comprising a compartment containing said slat groups wherein said drive cylinders are located externally of said compartment.

9. The reciprocating floor conveyor of claim 8 wherein said wall between said cross-members and said drive cylinders is an end wall of said compartment, and said drive cylinders are located in a drive cylinder chamber structurally integral with said compartment and including a floor and side walls.

10. A drive mechanism for a reciprocating floor conveyor including a plurality of individually reciprocatable groups of slats where each of the slats has an end, said drive mechanism comprising:

drive means adjacent the ends of the slats, said drive means including a drive cylinder for each of the slat groups a cross-member for each of the slat groups fixedly securing all of the slats of one of the slat groups, and a drive rod for each of the slat groups connecting one of the said drive cylinders and one of said cross-members; and
a wall between said cross-members and said drive cylinders, said drive rods extending through said wall.

11. The drive mechanism of claim 10 having three drive cylinders, three cross-members and three drive rods.

12. The drive mechanism of claim 10 wherein each of said cross-members is an elongated beam having longitudinal edges, said longitudinal edges being beveled.

13. The drive mechanism of claim 10 wherein each of said cross-members is secured to each of the slats of one of the slat groups by fixing each of the slats between said cross-member and a bar under the slat.

14. The drive mechanism of claim 10 further comprising a substantially planar, angled shield over said cross-members, said shield preventing material being conveyed from contacting said cross-members.

15. The drive mechanism of claim 10 wherein said drive cylinders abut said wall to prevent liquid leakage.

16. The drive mechanism of claim 10 wherein the slat groups are contained in a compartment and said drive cylinders are located externally of the compartment.

17. The drive mechanism of claim 16 wherein said wall between said cross-members and said drive cylinders is an end wall of the compartment, and said drive cylinders are located in a drive cylinder chamber structurally integral with the compartment and including a floor and side walls.

18. A reciprocating floor conveyor comprising:
a plurality of individually reciprocatable groups of slats, each of said slats having an end;
drive means adjacent said ends of said slats, said drive means including a drive cylinder for each of said slat groups, a cross-member for each of said slat groups securing all of said slats of one of said slat groups, each of said cross-members having longitudinal edges that are beveled, and a drive rod for each of said slat groups connecting one of said drive cylinders and one of said cross-members; and
a wall between said cross-members and said drive cylinders, said drive rods extending through said wall, said drive cylinders abutting said wall to prevent liquid leakage.

19. A container comprising:
a front wall, sidewalls and a bottom defining a compartment;
a plurality of individually reciprocatable groups of slats in said compartment, each of said slats having an end;
drive means adjacent said ends of said slats, said drive means including a drive cylinder for each of said slat groups, a cross-member for each of said slat groups securing all of said slats of one of said slat groups, and a drive rod for each of said slat groups collecting one of said drive cylinders and one of said cross-members; and
a bulkhead between said cross-members and said drive cylinders, said drive rods extending through said bulkhead.

20. The container of claim 19 wherein said drive cylinders are located externally of said compartment and said bulkhead is said front wall of said compartment.

* * * * *